(12) United States Patent
Liao

(10) Patent No.: US 12,507,064 B2
(45) Date of Patent: Dec. 23, 2025

(54) BLUETOOTH BURNING METHOD, BLUETOOTH BURNING APPARATUS, AND BLUETOOTH BURNING SYSTEM

(71) Applicants: OPPLE LIGHTING CO., LTD., Shanghai (CN); SUZHOU OPPLE LIGHTING CO., LTD., Suzhou (CN)

(72) Inventor: Dongnian Liao, Suzhou (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 211 days.

(21) Appl. No.: 18/215,807

(22) Filed: Jun. 28, 2023

(65) Prior Publication Data

US 2023/0422031 A1 Dec. 28, 2023

Related U.S. Application Data

(63) Continuation of application No. PCT/CN2021/140880, filed on Dec. 23, 2021.

(30) Foreign Application Priority Data

Dec. 30, 2020 (CN) .......................... 202011643366.2

(51) Int. Cl.
*G06F 7/04* (2006.01)
*G06F 15/16* (2006.01)
(Continued)

(52) U.S. Cl.
CPC ............. *H04W 12/04* (2013.01); *H04L 9/088* (2013.01); *H04L 9/30* (2013.01)

(58) Field of Classification Search
CPC ............ H04L 63/08; H04L 9/088; H04L 9/30
(Continued)

(56) References Cited

U.S. PATENT DOCUMENTS

2020/0162320 A1  5/2020  Kemp et al.
2021/0064560 A1*  3/2021  Zou .......................... G06F 8/63

FOREIGN PATENT DOCUMENTS

CN        103561125 A    2/2014
CN        104200843 A    12/2014
(Continued)

OTHER PUBLICATIONS

International Search Report of PCT Application No. PCT/CN2021/140880 dated Mar. 22, 2022 with English translation, (4p).

*Primary Examiner* — Jeffrey C Pwu
*Assistant Examiner* — Samuel Ambaye
(74) *Attorney, Agent, or Firm* — Arch & Lake LLP; Hao Tan; Shen Wang

(57) ABSTRACT

The present disclosure provides a Bluetooth burning method. The method is implemented by a Bluetooth burning apparatus. The method includes: reading a MAC address of a Bluetooth module; acquiring a configuration file PID product model and CID manufacturer serial number corresponding to the Bluetooth module; acquiring an encrypted ciphertext Secret, and decrypting the encrypted ciphertext Secret to obtain a Secret original text; saving a Bluetooth module quadruple (PID, MAC, Secret, CID) to a shared disk; and writing the Bluetooth module quadruple (PID, MAC, Secret, CID) to the Bluetooth module.

13 Claims, 2 Drawing Sheets

(51) Int. Cl.
*H04L 9/08* (2006.01)
*H04L 9/30* (2006.01)
*H04L 29/06* (2006.01)
*H04W 12/04* (2021.01)

(58) Field of Classification Search
USPC .......................................................... 726/7
See application file for complete search history.

(56) References Cited

FOREIGN PATENT DOCUMENTS

| | | | | |
|---|---|---|---|---|
| CN | 110971717 A | * | 4/2020 | ......... H04L 61/3005 |
| CN | 111679834 A | | 9/2020 | |
| WO | 2018121573 A1 | | 7/2018 | |

\* cited by examiner

BLUETOOTH BURNING METHOD, BLUETOOTH BURNING APPARATUS, AND BLUETOOTH BURNING SYSTEM

CROSS-REFERENCE TO RELATED APPLICATIONS

This application is based upon and claims the priority of PCT patent application No. PCT/CN2021/140880 filed on Dec. 23, 2021 which claims priority to the Chinese patent application No. 202011643366.2, filed on Dec. 30, 2020, the entire contents of which are hereby incorporated by reference herein for all purposes.

TECHNICAL FIELD

The application belongs to a field of system burning, and more particularly, to a Bluetooth module burning method.

BACKGROUND

Bluetooth networking is a very popular new technology solution in recent years, and many existing smart apparatus (such as Tmall Genie and Xiaomi Xiaoai) all employ a Bluetooth mesh solution for networking, and tens of billions of Bluetooth apparatus conduct mesh networking every year. Each Bluetooth BLE Sig mesh has unique quadruple information, which is an indispensable factor used in a Sig Mesh ad hoc networking process.

SUMMARY

The present disclosure provides a Bluetooth module burning method, a Bluetooth burning apparatus, and a Bluetooth burning system.

The present disclosure provides a Bluetooth burning method, being implemented by a Bluetooth burning apparatus, comprising: reading a MAC address of a Bluetooth module; acquiring a configuration file PID product model and CID manufacturer serial number corresponding to the Bluetooth module; acquiring an encrypted ciphertext Secret; decrypting the encrypted ciphertext Secret to obtain a Secret original text; saving a Bluetooth module quadruple (PID, MAC, Secret, CID) to a shared disk; and writing the Bluetooth module quadruple (PID, MAC, Secret, CID) to the Bluetooth module.

The present disclosure further provides a Bluetooth burning apparatus, comprising: a processor; a camera; a communication module; a writing module; and a memory. The processor is electrically connected with the camera, the communication module, the writing module, and the memory, respectively. The camera reads a MAC address of the Bluetooth module and sends the MAC address to the processor. The processor acquires a configuration file PID product model and CID manufacturer serial number corresponding to the Bluetooth module from the memory. The communication module acquires an encrypted ciphertext Secret and sends the encrypted ciphertext Secret to the processor, and the processor decrypts the encrypted ciphertext Secret to obtain a Secret original text. The communication module saves a Bluetooth module quadruple (PID, MAC, Secret, CID) to a shared disk and the writing module writes the Bluetooth module quadruple (PID, MAC, Secret, CID) to the Bluetooth module.

The present disclosure provides a Bluetooth burning system, comprising: a cloud server, a shared disk, and the above-mentioned Bluetooth burning apparatus. The Bluetooth burning apparatus is in communication connection with the cloud server and the shared disk, respectively.

It is to be understood that the foregoing general description and the following detailed description are exemplary and explanatory only and are not restrictive of the disclosure.

BRIEF DESCRIPTION OF DRAWINGS

The following is a detailed description of the specific implementations of the present disclosure combined with the accompanying drawings, which will make the technical solution and other beneficial effects of the present disclosure intelligible.

DETAILED DESCRIPTION

In order to make objectives, technical solutions, and advantages of the examples of the application more clear, the application will be further described in detail in combination with the drawings. The described examples are just a part but not all of the examples of the application. Based on examples of the application, those skilled in the art can obtain other example(s), without any inventive work, which should be within the scope of the application. The application is further described below in conjunction with the drawings.

Sometimes, a quadruple burning needs to manually import Excel files containing Secret, which will bring some problems, such as Excel format errors, duplicate MAC addresses burned in Excel, etc., which may cause burning failure; secondly, burning results are not stored centrally, and the quality control of the burning process cannot be conducted efficiently and in batches, especially when multiple tooling is burned at the same time across factories, if the burning results are not stored centrally, it will cause difficult verification, easy miscalculation, and missing statistics.

Figure 1:
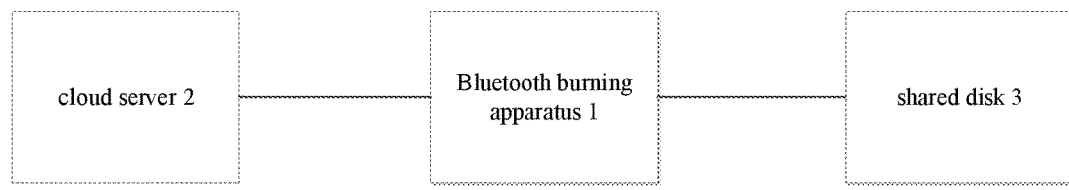
FIG. 1 is a schematic diagram of a Bluetooth module burning system provided by an example of the present disclosure.

FIG. 1 is a schematic diagram of a Bluetooth module burning system preferably selected for an example of the application.

As illustrated in FIG. 1, a Bluetooth module burning system includes a Bluetooth burning apparatus 1, a cloud server 2, and a shared disk 3, wherein the Bluetooth burning apparatus 1 is electrically connected with the cloud server 2 and the shared disk 3, respectively.

Figure 2:
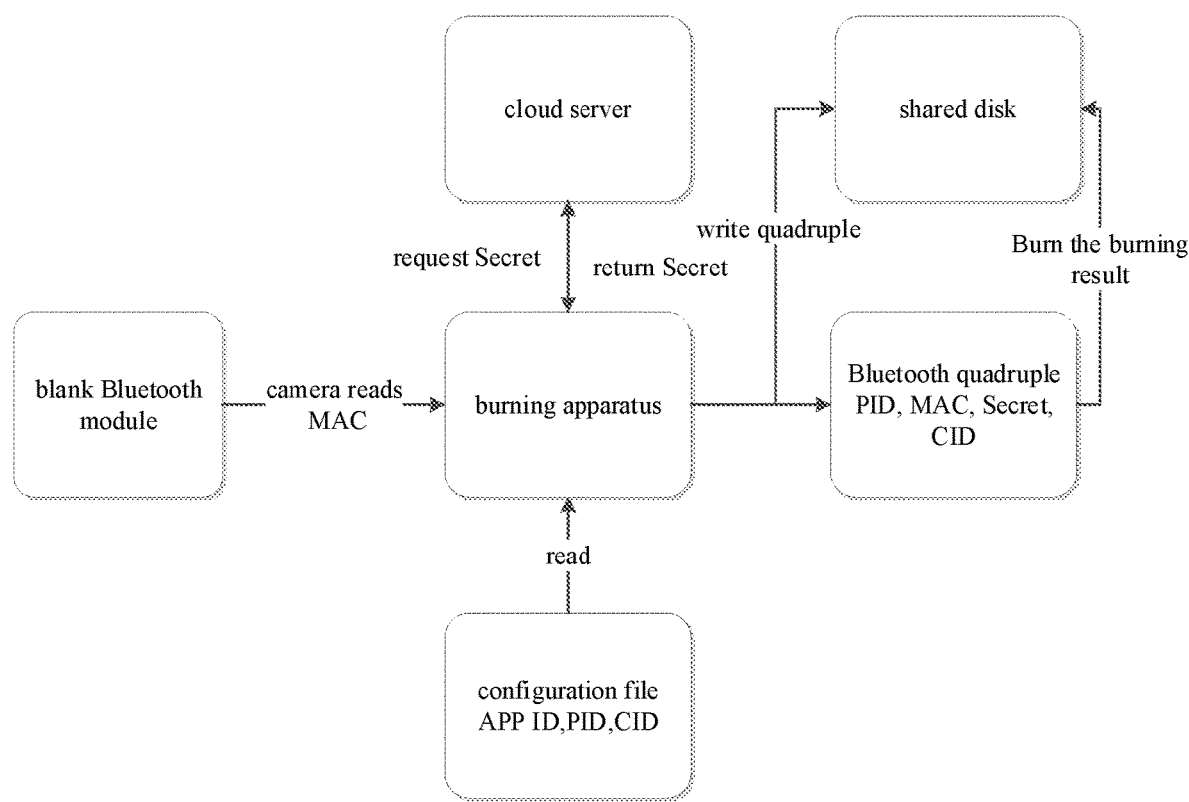
FIG. 2 is a flow schematic diagram of a Bluetooth module burning system provided by an example of the present disclosure.

FIG. 2 is a flow schematic diagram of a Bluetooth module burning method preferably selected for an example of the application.

As illustrated in FIG. 2, a process of Bluetooth module burning method comprises:

S1, when a blank Bluetooth module is begun to be burned, the Bluetooth burning apparatus 1 reads a MAC address of the blank Bluetooth module by a camera, and the blank Bluetooth module only includes a 13-bit MAC address.

S2, the Bluetooth burning apparatus 1 reads PID (product model) and CID (unique manufacturer number assigned by the Bluetooth Association) corresponding to the Bluetooth module. PID and CID are pre-obtained and saved on local or on a server. PID and CID can be read from the local or from the server when the Bluetooth burning apparatus 1 needs read them.

S3, the Bluetooth burning apparatus 1 sends Secret request message to the cloud server 2.

S4, after the cloud server 2 receives the Secret request message sent by the Bluetooth burning apparatus 1, the cloud server 2 generates a Secret in real time, and the cloud server 2 encrypts the generated Secret with a preset public key (RSA2), and sends an encrypted Secret to the Bluetooth burning apparatus 1.

S5, after the Bluetooth burning apparatus 1 obtains the Secret sent by the cloud server 2, a pre-stored private key (RSA2) is used to decrypt the Secret to obtain an original Secret. Compared with a manual EXCEL importing method in the prior art, this method implements automatic operation, avoids error of manual importing, and has more stable performance. In addition, by a method of the public key encryption and the private key decryption, the security of transmission can be ensured.

S6, the Bluetooth burning apparatus 1 writes Bluetooth quadruple (PID, MAC, Secret, CID) to the shared disk 3. Because the security of the quadruple (PID, MAC, Secret, CID) of the Bluetooth module is very important, it is necessary to save the quadruple in the shared disk 3 in intranet. A quadruple file can be viewed by an account with access rights within a company. The quadruple file cannot be viewed by an account without the access rights (an access record for viewing is kept) and any external network users cannot access it, which provides the security of the quadruple of the Bluetooth module. The automatic writing of the Secret can be implemented, so that the error of manual importing is avoided, and the performance is more stable.

S7, the Bluetooth burning apparatus 1 burns the quadruple (PID, MAC, Secret, CID) into the Bluetooth module, and saves a burning result to the shared disk 3, and the burning result corresponds to the quadruple (PID, MAC, Secret, CID), that is, the corresponding information of each Bluetooth module is saved in one row. In a Secret writing process, an encryption method is used to ensure the security of the Secret. In addition, after obtaining the quadruple, the quadruple information is saved in the shared disk, a quadruple file can be viewed by an account with access rights within a company, the quadruple file cannot be viewed by an account without the access rights, an access record for viewing is kept, and any external network users cannot access it, which provides the security of the quadruple of the Bluetooth module.

Figure 3:
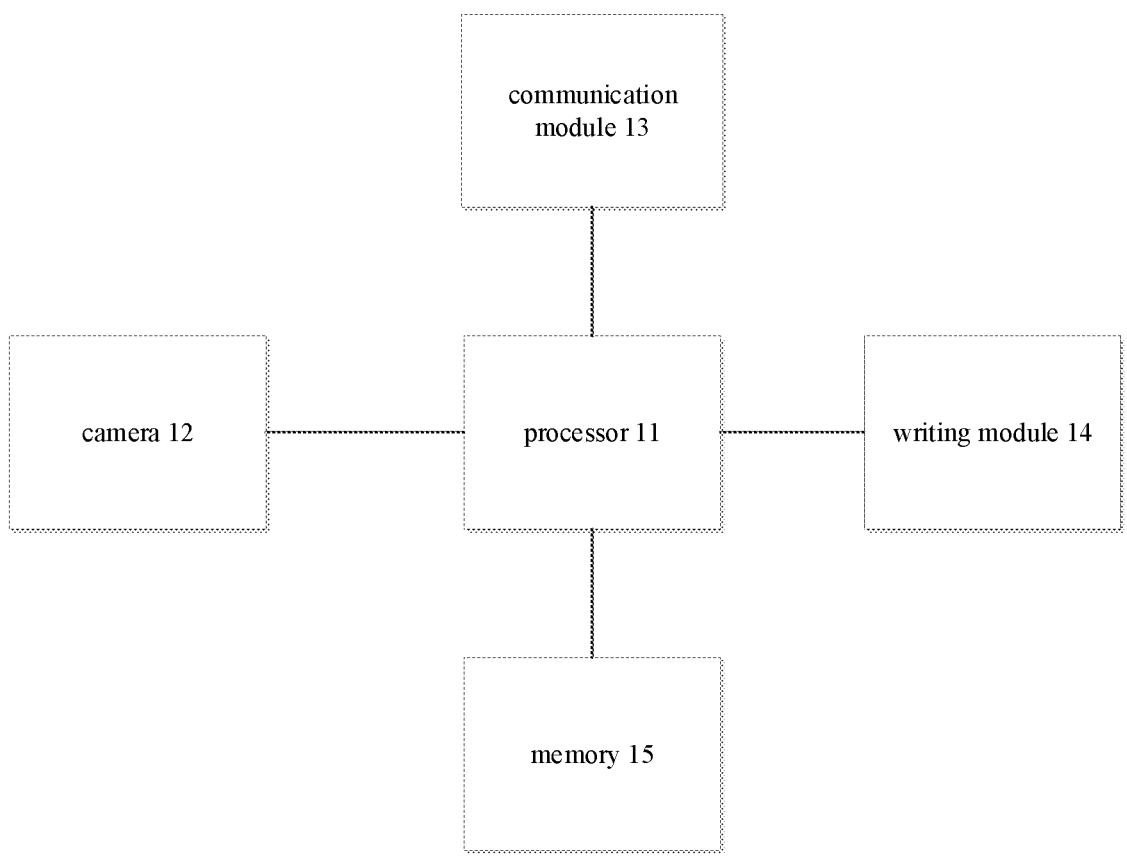
FIG. 3 is a structure schematic diagram of a Bluetooth burning apparatus provided by an example of the present disclosure.

FIG. 3 is a structure schematic diagram of a Bluetooth burning apparatus preferably selected for an example of the application.

As illustrated in FIG. 3, the Bluetooth burning apparatus 1 includes a processor 11, a camera 12, a communication module 13, a writing module 14, and a memory 15. The processor 11 is electrically connected with the camera 12, the communication module 13, the writing module 14, and the memory 15 electrical connection, respectively.

When the Bluetooth burning apparatus 1 needs to burn a Bluetooth module, the Bluetooth burning apparatus 1 reads a MAC address of the blank Bluetooth module by the camera 12, and sends the MAC address of the blank Bluetooth module to the processor 11. The processor 11 reads pre-obtained PID, CID from the memory 15. The processor 11 sends a Secret request message to the cloud server 2 by the communication module 13, and obtains Secret encrypted by a public key (RSA2) from the cloud server 2, and the processor 11 uses a private key (RSA2) to decrypt the encrypted Secret received from the cloud server, thereby obtaining the Secret original text.

The processor 11 saves the Bluetooth module quadruple (PID, MAC, SECRET, CID) to the shared disk 3 by the communication module 13, and writes the Bluetooth module quadruple (PID, MAC, Secret, CID) to the Bluetooth module by the writing module 14. The writing module 14 returns a writing result to the processor 11. The processor 11 then sends the writing result to the shared disk 3 by the communication module, and the writing result corresponds to the quadruple (PID, MAC, Secret, CID), that is, the corresponding information of each Bluetooth module is saved in one row.

With the above examples, the automatic writing of the Secret can be implemented, so that the error of manual importing is avoided, and the performance is more stable. Furthermore, in a Secret writing process, an encryption method is used to ensure the security of the Secret. In addition, after obtaining the quadruple, the quadruple information is saved in the shared disk, a quadruple file can be viewed by an account with access rights within a company, the quadruple file cannot be viewed by an account without the access rights, an access record for viewing is kept, and any external network users cannot access it, which provides the security of the quadruple of the Bluetooth module.

A purpose of the application is to solve the problem of burning failure, easy miscalculation and missing statistics when the Bluetooth module in prior art conducts manually burning, thereby proposing a new Bluetooth module burning method, a Bluetooth burning apparatus, and a Bluetooth burning system.

A first technical solution of the application: a Bluetooth burning method, being implemented by a Bluetooth burning apparatus, comprises: reading a MAC address of a Bluetooth module; acquiring a configuration file PID product model and CID manufacturer serial number corresponding to the Bluetooth module;

acquiring an encrypted ciphertext Secret, and decrypting the encrypted ciphertext Secret to obtain a Secret original text; saving a Bluetooth module quadruple (PID, MAC, Secret, CID) to a shared disk; and writing the Bluetooth module quadruple (PID, MAC, Secret, CID) to the Bluetooth module.

Further, the Bluetooth burning apparatus is configured with a camera, the Bluetooth burning method further comprises reading the MAC address of the Bluetooth module by the camera of the Bluetooth burning apparatus.

Further, in steps of the acquiring an encrypted ciphertext Secret, and decrypting the encrypted ciphertext Secret to obtain a Secret original text, the Bluetooth burning apparatus sends a Secret request message to a cloud server, and receives a Secret encrypted by a public key sent by the cloud server, and decrypts the Secret encrypted by the public key by using a private key, so as to obtain the Secret original text.

Further, the private key is pre-stored in the Bluetooth burning apparatus.

Further, the Bluetooth burning apparatus sends the Bluetooth module quadruple (PID, MAC, Secret, CID) to the shared disk, and the Bluetooth module quadruple is saved by the shared disk, wherein the Bluetooth burning apparatus and the shared disk are in the same intranet.

Further, the Bluetooth burning apparatus sends a writing result to the shared disk, and the shared disk saves the writing result, wherein the Bluetooth module quadruple corresponds to the writing result.

A second technical solution of the application: a Bluetooth burning apparatus comprises a processor, a camera, a communication module, a writing module, and a memory; the processor is electrically connected with the camera, the communication module, the writing module, and the memory, respectively; the camera reads a MAC address of the Bluetooth module and sends the MAC address to the processor; the processor acquires a configuration file PID product model and CID manufacturer serial number corresponding to the Bluetooth module from the memory; the communication module acquires an encrypted ciphertext Secret and sends the encrypted ciphertext Secret to the processor, and the processor decrypts the encrypted ciphertext Secret to obtain a Secret original text; the communication module saves a Bluetooth module quadruple (PID, MAC, Secret, CID) to a shared disk; and the writing module writes the Bluetooth module quadruple (PID, MAC, Secret, CID) to the Bluetooth module.

Further, the processor sends a Secret request message to a cloud server by the communication module, and receives a Secret encrypted by a public key sent by the cloud server; and the processor decrypts the Secret encrypted by the public key by using a private key, so as to obtain the Secret original text.

Further, the private key is pre-stored in the Bluetooth burning apparatus.

Further, the processor sends the Bluetooth module quadruple (PID, MAC, Secret, CID) to the shared disk by the communication module, and the Bluetooth module quadruple is saved by the shared disk, wherein the Bluetooth burning apparatus and the shared disk are in the same intranet.

Further, the writing module returns a writing result to the processor, and the processor sends the writing result to the shared disk, and the writing result is saved by the shared disk, wherein the Bluetooth module quadruple corresponds to the writing result.

A third technical solution of the application: a Bluetooth burning system, comprises a cloud server, a shared disk, and the above-mentioned Bluetooth burning apparatus. The Bluetooth burning apparatus is in communication connection with the cloud server and the shared disk, respectively.

Beneficial effects of the application is that: the Bluetooth module burning method of the application can implement the automatic writing of the Secret, so that the error of manual importing is avoided, and the performance is more stable. Furthermore, in a Secret writing process, an encryption method is used to ensure the security of the Secret. In addition, after obtaining the quadruple, the quadruple information is saved in the shared disk, a quadruple file can be viewed by an account with access rights within a company, the quadruple file cannot be viewed by an account without the access rights, an access record for viewing is kept, and any external network users cannot access it, which provides the security of the quadruple of the Bluetooth module.

Although examples of the application have been described, those skilled in the art can make additional changes and modifications to these examples upon they know the basic inventive concept. Therefore, the appended claims are intended to be interpreted to include preferred examples and all changes and modifications falling within the scope of the application.

Those skilled in the art can make various modifications and variations of the application without departing from the spirit and scope of the application. Therefore, if these modifications and variants of the application fall within the scope of the claims of the application and their equivalents, the application is further intended to include these modifications and variants.

What is claimed is:

1. A Bluetooth burning method, being implemented by a Bluetooth burning apparatus, and the method comprising:
    reading a Medium Access Control (MAC) address of a Bluetooth chip;
    acquiring a configuration file Process Identifier (PID) product model and Channel Identifier (CID) manufacturer serial number corresponding to the Bluetooth chip;
    sending a Secret request message to a cloud server, receiving a Secret encrypted by a public key sent by the cloud server, and decrypting the Secret encrypted by the public key by using a private key to obtain a Secret original text;
    saving a Bluetooth chip quadruple (PID, MAC, Secret, CID) to a shared disk; and
    writing the Bluetooth chip quadruple (PID, MAC, Secret, CID) to the Bluetooth chip.

2. The Bluetooth burning method according to claim 1, wherein the Bluetooth burning apparatus is configured with a camera, the Bluetooth burning method further comprises reading the MAC address of the Bluetooth chip by the camera of the Bluetooth burning apparatus.

3. The Bluetooth burning method according to claim 1, wherein the private key is pre-stored in the Bluetooth burning apparatus.

4. The Bluetooth burning method according to claim 3, wherein
    the Bluetooth burning apparatus sends the Bluetooth chip quadruple (PID, MAC, Secret, CID) to the shared disk,
    the Bluetooth chip quadruple is saved by the shared disk, and
    the Bluetooth burning apparatus and the shared disk are in the same intranet.

5. The Bluetooth burning method according to claim 4, wherein
    the Bluetooth burning apparatus sends a writing result to the shared disk,
    the shared disk saves the writing result, and
    the Bluetooth chip quadruple corresponds to the writing result.

6. A Bluetooth burning apparatus, comprising: a processor; a camera; a communication transmitter; a writing circuit; and a memory, wherein
    the processor is electrically connected with the camera, the communication transmitter, the writing circuit, and the memory, respectively,
    the camera reads a Medium Access Control (MAC) address of the Bluetooth chip and sends the MAC address to the processor,
    the processor acquires a configuration file Process ID (PID) product model and Channel ID (CID) manufacturer serial number corresponding to the Bluetooth chip from the memory,
    the processor sends a Secret request message to a cloud server by the communication transmitter, and receives a Secret encrypted by a public key sent by the cloud server,
    the processor decrypts the Secret encrypted by the public key by using a private key, so as to obtain the Secret original text,
    the communication transmitter saves a Bluetooth chip quadruple (PID, MAC, Secret, CID) to a shared disk, and the writing circuit writes the Bluetooth chip quadruple (PID, MAC, Secret, CID) to the Bluetooth identifier.

7. The Bluetooth burning apparatus according to claim 6, wherein the private key is pre-stored in the memory of the Bluetooth burning apparatus.

8. The Bluetooth burning apparatus according to claim 7, wherein
the processor sends the Bluetooth chip quadruple (PID, MAC, Secret, CID) to the shared disk by the communication transmitter,
the Bluetooth chip quadruple is saved by the shared disk, and
the Bluetooth burning apparatus and the shared disk are in the same intranet.

9. The Bluetooth burning apparatus according to claim 8, wherein
the writing circuit returns a writing result to the processor,
the processor sends the writing result to the shared disk,
the writing result is saved by the shared disk, and
the Bluetooth chip quadruple corresponds to the writing result.

10. A Bluetooth burning system, comprising:
a Bluetooth burning apparatus, comprising a processor; a camera; a communication transmitter; a writing circuit; and a memory, wherein
the processor is configured to electrically connect with the camera, the communication transmitter, the writing circuit, and the memory, respectively,
the camera is configured to read a Medium Access Control (MAC) address of the Bluetooth chip and send the MAC address to the processor,
the processor is configured to acquire a configuration file Process ID (PID) product model and Channel ID (CID) manufacturer serial number corresponding to the Bluetooth chip from the memory,
the processor is configured to send a Secret request message to a cloud server by the communication transmitter, and receive a Secret encrypted by a public key sent by the cloud server,
the processor is configured to decrypt the Secret encrypted by the public key by using a private key, so as to obtain the Secret original text,
the communication transmitter is configured to save a Bluetooth chip quadruple (PID, MAC, Secret, CID) to a shared disk, and
the writing circuit is configured to write the Bluetooth chip quadruple (PID, MAC, Secret, CID) to the Bluetooth chip;
a cloud server; and
a shared disk, wherein the Bluetooth burning apparatus is configured to communicationally connect with the cloud server and the shared disk, respectively.

11. The Bluetooth burning system according to claim 10, wherein the private key is pre-stored in the memory of the Bluetooth burning apparatus.

12. The Bluetooth burning system according to claim 11, wherein
the processor is configured to send the Bluetooth chip quadruple (PID, MAC, Secret, CID) to the shared disk by the communication transmitter,
the Bluetooth chip quadruple is saved by the shared disk, and
the Bluetooth burning apparatus and the shared disk are in the same intranet.

13. The Bluetooth burning system according to claim 12, wherein
the writing circuit is configured to return a writing result to the processor,
the processor is configured to send the writing result to the shared disk,
the writing result is saved by the shared disk, and
the Bluetooth chip quadruple corresponds to the writing result.

* * * * *